May 6, 1952  E. H. JACKSON, JR  2,595,855
DEVICE FOR CHANGING THE TRANSVERSE ARRANGEMENT OF CROSSWISE
CONTIGUOUS PORTIONS OF RIBBONLIKE MATERIALS
Filed Jan. 23, 1948  6 Sheets-Sheet 1
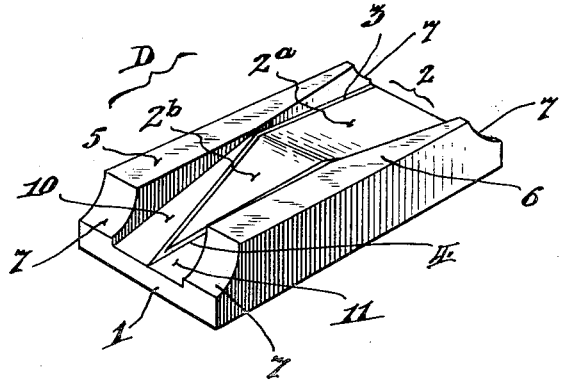
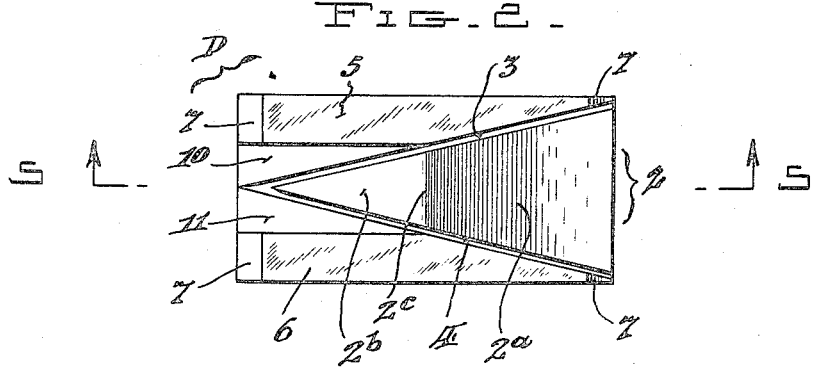
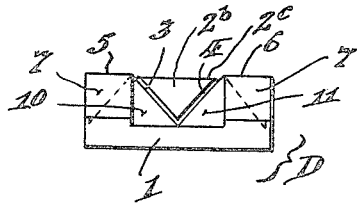
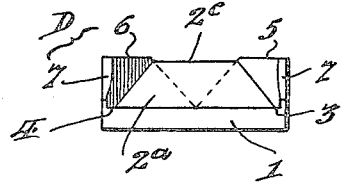
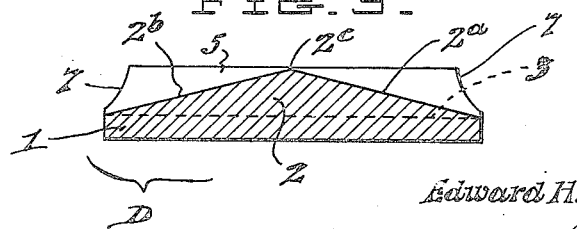
Inventor:
Edward H. Jackson Jr.,
By Alfred E. Dishinger,
Attorney.

May 6, 1952     E. H. JACKSON, JR     2,595,855
DEVICE FOR CHANGING THE TRANSVERSE ARRANGEMENT OF CROSSWISE
CONTIGUOUS PORTIONS OF RIBBONLIKE MATERIALS
Filed Jan. 23, 1948     6 Sheets-Sheet 2
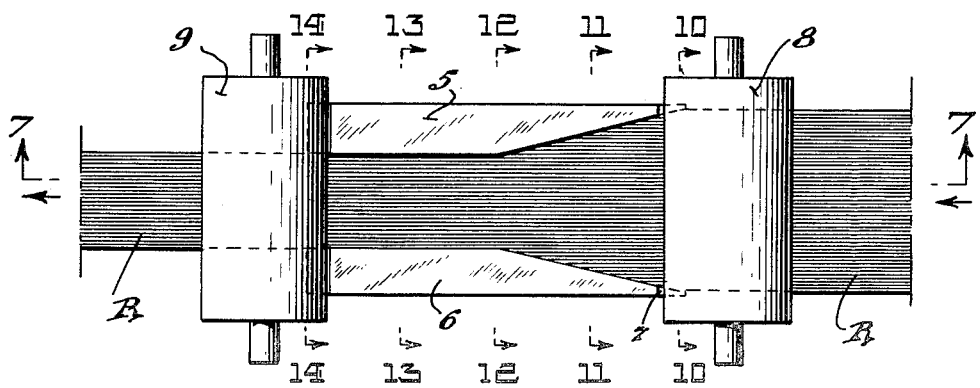
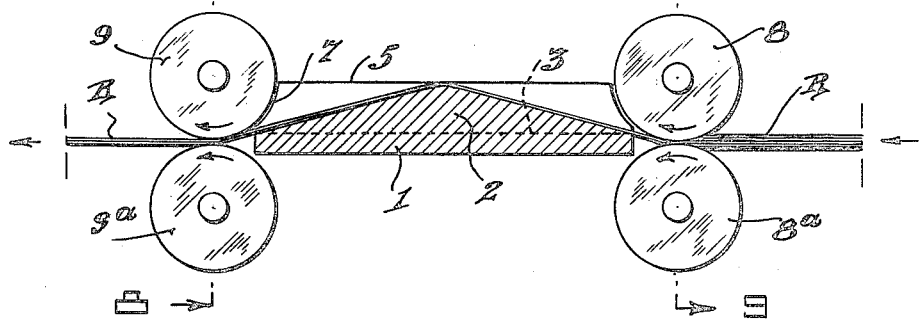
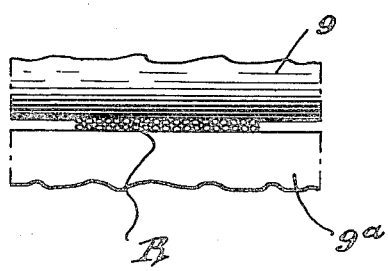
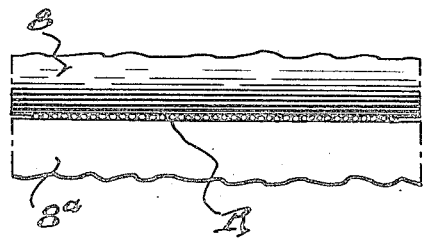
Inventor:
Edward H. Jackson Jr.,
By
Attorney.

May 6, 1952  E. H. JACKSON, JR  2,595,855
DEVICE FOR CHANGING THE TRANSVERSE ARRANGEMENT OF CROSSWISE
CONTIGUOUS PORTIONS OF RIBBONLIKE MATERIALS
Filed Jan. 23, 1948  6 Sheets-Sheet 3

Inventor:
Edward H. Jackson Jr.,
By Alfred E. Aschinger
Attorney.

May 6, 1952 E. H. JACKSON, JR 2,595,855
DEVICE FOR CHANGING THE TRANSVERSE ARRANGEMENT OF CROSSWISE
CONTIGUOUS PORTIONS OF RIBBONLIKE MATERIALS
Filed Jan. 23, 1948 6 Sheets-Sheet 4

Inventor:
Edward H. Jackson Jr.,
By Alfred E. Prekinges
Attorney.

May 6, 1952     E. H. JACKSON, JR     2,595,855
DEVICE FOR CHANGING THE TRANSVERSE ARRANGEMENT OF CROSSWISE
CONTIGUOUS PORTIONS OF RIBBONLIKE MATERIALS
Filed Jan. 23, 1948     6 Sheets-Sheet 5
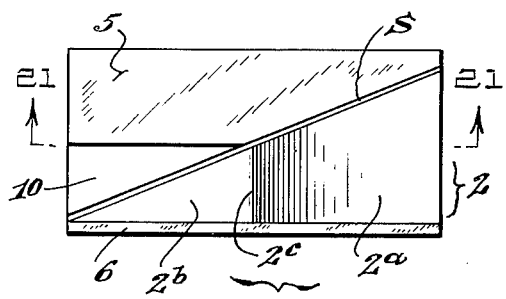
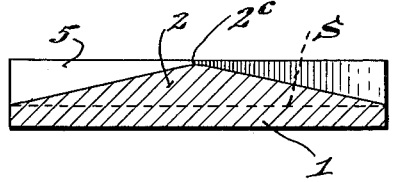
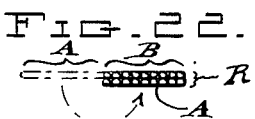
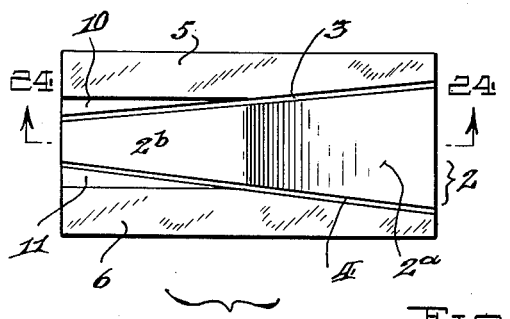
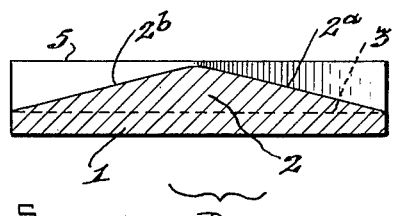
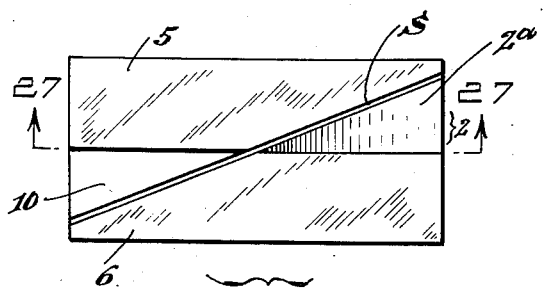
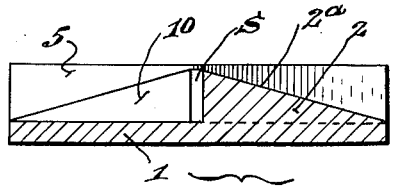
Inventor:
Edward H. Jackson Jr.,
By Alfred E. Uschinger
Attorney.

May 6, 1952   E. H. JACKSON, JR   2,595,855
DEVICE FOR CHANGING THE TRANSVERSE ARRANGEMENT OF CROSSWISE
CONTIGUOUS PORTIONS OF RIBBONLIKE MATERIALS
Filed Jan. 23, 1948   6 Sheets-Sheet 6
FIG. 29.   FIG. 30.
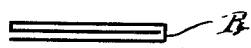   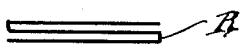
FIG. 31.   FIG. 32.
   
FIG. 33.   FIG. 34.
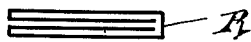   
FIG. 35.
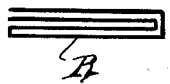
Inventor:
Edward H. Jackson Jr.,
By Alfred E. Ischinger,
Attorney.

Patented May 6, 1952

2,595,855

UNITED STATES PATENT OFFICE 2,595,855

DEVICE FOR CHANGING THE TRANSVERSE ARRANGEMENT OF CROSSWISE CONTIGUOUS PORTIONS OF RIBBONLIKE MATERIALS

Edward H. Jackson, Jr., Temple, Pa.

Application January 23, 1948, Serial No. 3,958

1 Claim. (Cl. 270—93)

This invention generally relates to the manufacture of products such as yarn, twine, rove, etc., involving a sliver of textile fibers, or some other form of ribbon-like material, and more particularly concerns a device for determinedly folding the crosswise contiguous portions of such a ribbon-like material, or changing the transverse arrangement thereof, during travel of the material from one point to another in the product manufacturing apparatus.

In the manufacture of certain products or articles, such as yarn, twine, rove, etc., from textile fibers or filaments, the fibers are first loosely combined or massed together to effect a "sliver," which is then subjected to one or more drawing operations. Various devices have heretofore been utilized to reduce the cross-sectional dimensions of the sliver, so as to effect their attenuation thereby to better adapt them for spinning, to straighten the fibers, and to draw them into a more nearly parallel relationship to each other which is desirable in order to produce yarn, twine, rove, etc., of maximum strength from a given staple. Since one or more of these drawing operations is necessary in order to work the sliver into a suitable form for the final spinning or twisting operation, it is evident that a long draft is of advantage in a single machine in order to produce these results with as few operations and as little handling of the fibers as possible. As a sliver is compressed in passing between the usual rolls, belts or equivalent devices which perform the drawing operation, those fibers at the edges of the flat, ribbon-like strip produced by such compression, are not gripped with the same degree of firmness as are those fibers between the margins of this strip. Some of them are scarcely gripped at all. Consequently, these edge fibers may get out of control if they are not drawn out in the same orderly manner as are those fibers in the main body of the sliver. It has been found in practice that these difficulties are reduced and satisfactory drafting is facilitated by folding the sliver transversely upon itself at an intermediate stage in the drawing operation, and thus moving the fibers at the extreme edges of the sliver back into the line of flow of the main body of fibers. However, the devices heretofore used for such purpose have not been found entirely satisfactory from a practical and commercial standpoint for various reasons. In some instances, it is troublesome to control the "fly" produced in the drawing frames in which such prior art devices are used. In other instances, such devices are difficult to "thread" or "piece up" and require the removal and replacement of parts in order to accomplish threading. In general, such devices also have a tendency to distort or vary the cross-sectional structure of the contiguous portions of the ribbon-like sliver during the folding operation, and are limited in their use since they cannot be readily provided to perform a variety of different folding operations, as required to facilitate the accomplishment of certain important and advantageous results with different types of ribbon-like materials.

One object of my invention is to provide a novel device which overcomes the indicated and other difficulties.

Another object is to provide such a device which can be readily installed in a machine or apparatus adapted to perform certain manufacturing operations on a ribbon-like material, for the purpose of changing the transverse arrangement of contiguous portions of the ribbon-like material during its travel from one point to another in such a machine.

A further object is to provide such a device which can be readily produced in such form that one or more of the devices can be utilized to effect different folding operations on various materials in ribbon-like formation. For example, on fibrous materials, such as a yarn, twine, or sliver, or on woven, braided or other textile ribbons, as well as on ribbons or bands made of flexible sheet materials, such as paper, cellophane, etc.

An additional object is to provide such a device which can be used to effect a partial fold, a complete fold or doubling, or a multiple fold, on various ribbon-like materials of the type indicated, as well as complete reversal thereof, so that the initial cross-sectional configuration of the ribbon-like material may be changed substantially to any extent desired.

It is also an object to provide such a device which embodies structural and functional features of advantage over the similar devices of the prior art.

Another object is to provide such a device which can be cooperatively mounted in a machine adapted to perform certain manufacturing operations on a ribbon-like material of the type indicated, and which device embodies a segmental pattern of flat guide surfaces suitable for contactingly conducting contiguous portions of the material therealong in lengthwise direction and flat formation so as to change the transverse arrangement of said contiguous portions in accordance with said pattern during movement of the material through the device.

Another object is to provide such a device which comprises a base adapted to be mounted between two feed roller units arranged to advance a ribbon-like material from one point to another in a machine adapted to perform certain manufacturing operations on the material, which base has extending upwardly therefrom means including a segmental pattern of flat top and side guide surfaces that are positioned in angular relation with respect to each other and suitable for contactingly conducting contiguous portions of the material therealong in lengthwise direction and flat formation so as to change the transverse arrangement of said contiguous portions in accordance with said pattern.

With these and other objects in view, which will become more apparent from the following detailed description of the various illustrative and practical embodiments of my device, shown in the accompanying drawings, the invention comprises the novel device, elements, features of construction and arrangement of parts in cooperative relationship, as more particularly defined by the hereto appended claim.

In the drawings:

Figure 1 is a front perspective view of one form of device which embodies my invention.

Fig. 2 is a top plan view of the device.

Fig. 3 is a front elevational view of the device.

Fig. 4 is a rear elevational view of the device.

Fig. 5 is a central longitudinal elevational sectional view of the device, taken substantially as indicated by the arrows 5—5 in Fig. 2.

Fig. 6 is a top plan view of the device shown in Figs. 1 to 5 inclusive, as it appears in operative position between two roller units adapted to feed a ribbon-like material, such as a fibrous sliver, through the device.

Fig. 7 is a central longitudinal elevational sectional view, taken substantially as indicated by the arrows 7—7 in Fig. 6, however, with the rollers of the roller units shown in full.

Fig. 8 is an enlarged fragmentary sectional view, taken substantially as indicated by the arrows 8—8 in Fig. 7.

Fig. 9 is an enlarged fragmentary sectional view, taken substantially as indicated by the arrows 9—9 in Fig. 7.

Fig. 20 is a top plan view of another modified form of my device.

Fig. 21 is a longitudinal elevational sectional view, taken substantially as indicated by the arrows 21—21 in Fig. 20.

Fig. 22 is a cross-sectional view through a ribbon-like material and illustrates the manner in which the arrangement of the contiguous portions of the material are changed by passage thereof through the device illustrated in Figs. 20 and 21.

Fig. 23 is a top plan view of another modified form of my device.

Fig. 24 is a longitudinal elevational sectional view, taken substantially as indicated by the arrows 24—24 in Fig. 23.

Fig. 25 is a cross-sectional view through a ribbon-like material and illustrates the manner in which the arrangement of the contiguous portions of the material are changed by passage thereof through the device illustrated in Figs. 23 and 24.

Fig. 26 is a top plan view of another modified form of my device.

Fig. 27 is a longitudinal elevational sectional view, taken substantially as indicated by the arrows 27—27 in Fig. 26.

Fig. 28 is a cross-sectional view through a ribbon-like material and illustrates the manner in which the arrangement of the contiguous portions of the material are changed by passage thereof through the device illustrated in Figs. 26 and 27.

Figure 10:
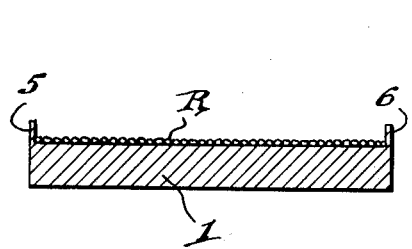
Fig. 10 is an enlarged cross-sectional view, taken substantially as indicated by the arrows 10—10 in Fig. 6.
Figure 11:
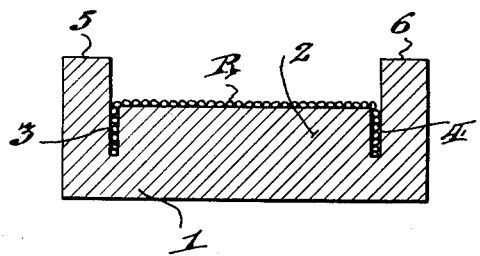
Fig. 11 is an enlarged cross-sectional view, taken substantially as indicated by the arrows 11—11 in Fig. 6.

Figs. 29 to 35 inclusive are similar diagrammatic cross-sectional views of ribbon-like materials, and respectively illustrate different folding arrangements which can be effected by utilizing one or more devices in accordance with my invention.

Drafting mechanisms for slivers and the like, as utilized in the manufacture of yarn, twine, rope, rove, etc., are well-known. For information concerning this general subject, reference may be had to such prior art patents as the following: 1,217,067, G. L. Rice, Feb. 20, 1917; 2,306,377, W. F. Bird et al., Dec. 29, 1942; 373,818, H. S. Dix, Nov. 29, 1887; 2,187,830, R. M. Jones, Jan. 23, 1940; 2,230,399, C. D. Brandt et al, Feb. 4, 1941; 2,238,659, W. G. Reynolds, Apr. 15, 1941; 2,239,403, O. W. Schlums, Apr. 22, 1941; 2,111,139, O. S. Carliss, Mar. 15, 1938; and 2,203,423, C. Walsh et al., June 4, 1940.

As will be clear by reference to such patents, various devices have heretofore been provided which are designed to effect the folding of a sliver upon itself in a certain manner, at an intermediate stage in the drawing operation. The proper location for such devices in a drawing or spinning apparatus, is consequently well established. The device of my invention is also mounted at said location in a drawing or spinning apparatus, and will perform its intended function when so mounted. To simplify the disclosure of my invention, the well-known parts of a drawing or spinning apparatus have not been shown in conjunction with the various illustrations of my device. It being sufficient to an understanding of the construction and operation of my device to disclose the same mounted between two usual type sliver or other ribbon-like material advancing roller units, as indicated in Figs. 6 and 7 of the drawings. The various modified forms of my device illustrated throughout the drawings, are adapted to be mounted in exactly the same manner as the particular form of my device shown in Figs. 6 and 7.

It will facilitate an understanding of the improvements here involved to first briefly consider the broader phases and aspects of the invention, so that these may be readily recognized as the description of the various embodiments of my device proceeds. Accordingly, it is noted that the devices herein shown and described all embody certain fundamental or common structural features that can be readily varied in proportion and arrangement so as to enable the provision of one or more such devices for effecting a substantially unlimited variety of changes in the transverse arrangement of the crosswise contiguous portions of a ribbon-like material, during its travel from one point to another in an apparatus designed to carry out various manufacturing operations on the said material. The fundamental or common structural features referred to comprise the provision in each device of a determined order, or pattern, of flat guide surfaces for the material, which surfaces are suitable for contactingly conducting the crosswise contiguous portions of the material therealong in lengthwise direction and flat formation in such manner that the arrangement of said portions will be changed in accordance with said pattern of the guide surfaces during movement of the material through the device. Among the changes which can be effected in the transverse arrangement of the crosswise contiguous portions of the material are, a partial fold, a complete fold or doubling, a multiple fold, and complete reversal of the material so that it will be turned upside down.

For illustrative purposes, the embodiment of my invention which will be described first, discloses the operation of the device as carried out on a ribbon-like material, such as a sliver of fibrous material used in the manufacture of yarn, twine, or rope, rove, etc. However, it is to be understood that the term "ribbon-like material" is used in its broad or generic sense to mean any conventional type flat, relatively thin, band or ribbon of material, including woven, braided, or other textile ribbons, as well as ribbons or bands made of sheet materials, such as paper, cellophane, etc.; and that all the embodiments of my invention herein disclosed are adapted to carry out their intended purpose and function on any or all such ribbon-like materials.

Referring now to the drawings, Figs. 1 to 14 inclusive depict one practical and illustrative form of device D which embodies my invention. The device there shown may be made of a single piece of material, such as wood, metal, plastic material, or the like, which is capable of being readily shaped, or formed, as illustrated, and which material lends itself to the provision of certain smooth guide surfaces suitable for contactingly conducting therealong the material which is to be subjected to a folding action. The device generally comprises a base section or member 1, having integrally formed therewith a centralized lengthwise extending member 2, provided at its top with smooth oppositely inclined surface sections 2a and 2b. Two members 10 and 11 are also integrally formed with the base member 1, which members 10 and 11 are provided with smooth top surfaces in planular alignment with the top surface 2b of the member 2. The member 2 has its sides defined by vertically extending grooves 3 and 4, arranged in V-shaped formation lengthwise of the device and in such manner that the meeting point of the grooves is located at one end edge of the device, and the grooves are separated to the maximum extent at the other end edge of the device. The opposite side walls and the bottom surfaces which define the grooves 3 and 4, are also made smooth so as to be suitable for contactingly conducting therealong the side edge portions of the material to be folded, in a manner which will become apparent as the description proceeds.

The member 2 is shaped in longitudinal section as shown in Fig. 5, so that the top guide surfaces 2a and 2b thereof meet in a slightly curved or rounded edge 2c, which extends transversely of the device substantially midway of the end edges of the latter. The grooves 3 and 4 are cut, or otherwise formed, so that they extend to the base member 1, as clearly shown.

Longitudinally extending side wall members 5 and 6 are integrally formed with the base member 1, and extend upwardly from the latter to a point slightly above the edge 2c of the central member 2. The front and rear ends of the wall members 5 and 6 are provided with similar curved recesses 7, so as to permit the ends of the device to be closely positioned between and adjacent to, two similar material advancing feed roller units, each of which units, in the present instance, comprises a pair of vertically arranged rollers, respectively designated 8, 8a, and 9, 9a, in Figs. 6 and 7.

The device shown in Figs. 1 to 14 inclusive is designed to fold each side portion of a ribbon-like material R, inwardly and under the central portion thereof, so as to effect doubling of the thickness of the material R. As previously indicated, the material R shown in Figs. 6 to 14 inclusive is in the form of a fibrous sliver, of the type utilized in the production of yarn, twine, rope, rove, or the like. The initial width of the material R is equal to the distance that the grooves 3 and 4 are separated at the edge of the device adjacent to the rollers 8 and 8a. The device D functions to double, or fold the material R to one-half its width, and the distance between the inner walls of the side members 5 and 6, from substantially the center of the device to the end edge of the latter which is adjacent the rollers 9 and 9a, is equal to one-half of the initial width of the material R. The height of the central member 2, from the edge 2c to the top surface of the base member 1, is equal to one-fourth of the width of the initial width of the material R, or one-half of the distance between the inner parallel walls of the side members 5 and 6. These proportions of the device are critical and the reason for this will become apparent from the following description of the operation of the device D.

The two pairs of material advancing rollers 8, 8a and 9, 9a are driven in the direction indicated by the arrows thereon, in any usual manner, by conventional means suitable for this purpose, the pairs of rollers 8, 8a and 9, 9a, are also adjustably mounted in usual manner so that they may be adjusted for gripping, or compressing, the material R as desired, and both pairs of said rollers may be driven at the same rate of speed, or the rollers 9, 9a, may be driven at a slightly greater speed than the rollers 8, 8a, that is, the speed differential may be in the order of about 1%. The ribbon-like material R, after leaving the drawing means of a spinning apparatus, or some other means of the machine in which the device D is mounted, is arranged to pass between the material advancing rollers 8, 8a, then through the device D and then between the material advancing rollers 9 and 9a. Thereafter, the material R may be fed to another drawing means, or some other mechanism of the machine in which the device D is incorporated, as desired, or required, in the manufacture of the material R into a yarn, twine, rope, rove, or some other article, or product, as the case may be.

Figure 12:
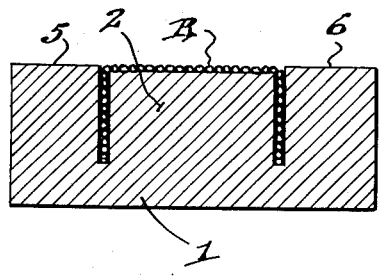
Fig. 12 is an enlarged cross-sectional view, taken substantially as indicated by the arrows 12—12 in Fig. 6.
Figure 13:
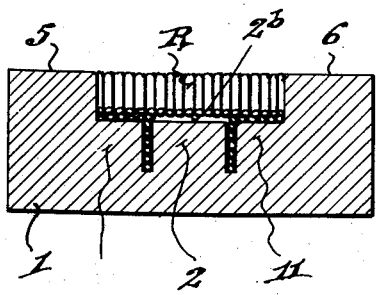
Fig. 13 is an enlarged cross-sectional view, taken substantially as indicated by the arrows 13—13 in Fig. 6.
Figure 14:
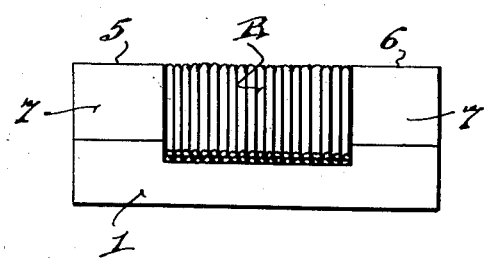
Fig. 14 is an enlarged cross-sectional view, taken substantially as indicated by the arrows 14—14 in Fig. 6.

During the time that the ribbon-like material R is moved in lengthwise direction through the device D, the central portion of the material will first contactingly slide along the flat guide surface 2a. The edge sections of the contiguous side portions of the material R will enter the grooves 3 and 4, after passing between the rollers 8 and 8a, and will then progressively advance vertically along the smooth vertical guide surfaces provided by the inner walls of the grooves 4 and 5, as clearly shown in Figs. 10, 11 and 12. This will result in first gradually and progressively vertically positioning equal contiguous side portions of the material R, relative to the horizontal central portion thereof, until the material reaches the center line or edge 2c of the guide surfaces 2a and 2b, at which time the width of each vertical side portion of the material R is equal to one-half of the width of the horizontally positioned central portion of the material, as shown in Fig. 12. Continued lengthwise advancing movement of the material R will then result in progresive movement of the vertically positioned side portions of the material out of the sections of the grooves or slots 3 and 4 located beyond the edge 2c, and in progressive manner along the smooth flat top guide surfaces of the members 10 and 11 which extend from the slots 3 and 4 to the side wall members 5 and 6 in the same horizontally inclined plane as the surface 2b. The said contiguous side portions of the material R will consequently be laterally turned under and moved progressively inwardly along the bottom surface of the central portion of the material R, as shown in Figs. 13 and 14. After passing the transverse edge 2c, the flat central portion of the material R will extend, or will be drawn from the edge 2c to its next point of support between the rollers 9 and 9a, and this provides sufficient clearance under the central portion of the material to permit the side portions to be moved inwardly to their folded positions under said central portion, as just explained. When the material R leaves the edge of the device D which is located adjacent to the material advancing rollers 9 and 9a, the material R will have been folded in half, or exactly doubled in thickness, as will be apparent by reference to Figs. 8 and 9.

It is to be noted that during lengthwise movement of the material R through the device D, as just described, the vertical side portions of the material R will contactingly slide along the smooth flat inner guide surfaces, or side walls, of the grooves 3 and 4 until the material R reaches the transverse edge line 2c which divides the smooth flat guide surfaces 2a and 2b of the member 2. Thereafter, the vertical side portions of the material R will contactingly slide along the smooth flat outer guide surfaces, or side walls, of the grooves 3 and 4 and the smooth top surfaces of members 10 and 11, until the material R reaches the juncture point of the grooves 3 and 4 at the end edge of the device D which is adjacent to the rollers 9 and 9a. Accordingly, the device D is provided with a determined order, or pattern, of flat guide surfaces which are made smooth so as to be suitable for contactingly conducting the crosswise contiguous portions of the ribbon-like material therealong in lengthwise direction and flat formation thereby to effect a change in the transverse arrangement of said contiguous portions in accordance with the determined order, or pattern, of said flat guide surfaces.

In the arrangement of the said flat material guide surfaces of the device D shown in Figs. 1 to 14 inclusive, the two flat vertical inner material guide walls or surfaces of the grooves 3 and 4, which extend from the end edge of the device D to the transverse edge line 2c, form complementary guide surfaces to the guide surface 2a. Likewise, the two flat vertical outer guide walls or surfaces of the grooves 3 and 4, which extend from a point adjacent to the transverse edge line 2c to the point of juncture of the grooves 3 and 4, form complementary material guide surfaces to the top guide surfaces of the members 10 and 11.

The crosswise contiguous portions of the material R, to the extent of the full width of the latter, consequently contactingly travel along a certain segmental arrangement, or pattern, of flat guide surfaces during movement of the material through the device. This causes a change in the initial transverse arrangement of the crosswise contiguous portions of the material in accordance with the order, relationship, or pattern, of the flat guide surfaces. As will become apparent from the later description of several modified forms of my invention, the segmental order, or pattern, of the flat guide surfaces can be readily incorporated in the device in such manner that the material traveling through the latter will have the initial arrangement of its crosswise contiguous portions varied, or folded, in many different ways.

The modified form of device shown in Figs. 15, 16, 17 and 19, constitutes a somewhat simplified construction of the device already described. The device of Figs. 15, 16, 17 and 19, is used in exactly the same manner as the device D of Figs. 1 to 14 inclusive, for the purpose of accomplishing the same result. That is to say, the device of Figs. 15, 16, 17 and 19, when substituted for the previously described device D, between the two pairs of material advancing rollers 8, 8a and 9, 9a shown in Figs. 6 and 7, will effect exactly the same folding action on a ribbon-like material R, as effected by the already described device D.

Since the device of Figs. 15, 16, 17 and 19, is structurally the same in many respects to the described device D of Figs. 1 to 14 inclusive, the corresponding parts of both devices have been identified by corresponding reference characters so as to avoid redundancy of descriptive matter. However, for purposes of differentiation, the device of Figs. 15, 16, 17 and 19, is generally identified by the reference character D1.

Figure 15:
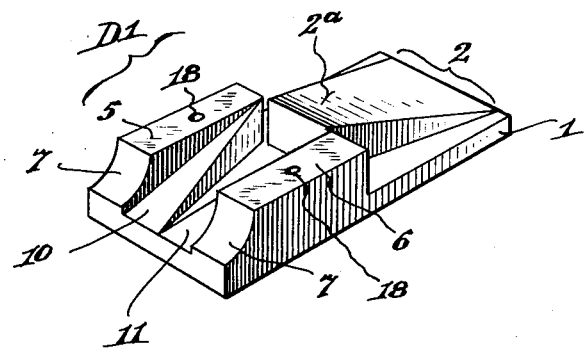
Fig. 15 is a front perspective view of a modified form of my device.
Figure 16:
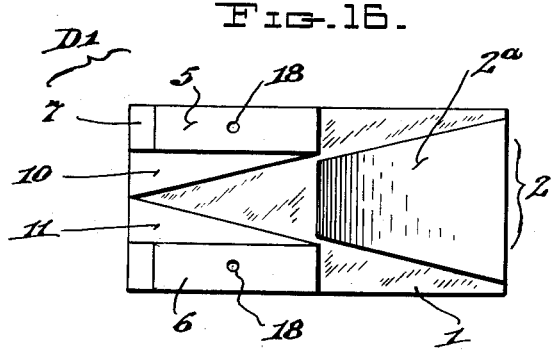
Fig. 16 is a top plan view of the device shown in Fig. 15.

By comparing Figs. 1 and 2 of the drawings with Figs. 15 and 16, it will be noted that the device D1 differs from the device D in that the member 2 of the device D1 terminates in the center of the device D1, and in that the side wall members 5 and 6 likewise terminate in the vertical plane passing through the center of the device D1. Otherwise, the correspondingly identified parts of the devices D and D1 are the same in size, arrangement and in all other respects.

The pattern and arrangement of the flat segmental guide surfaces for the material R, that are present in the device D1, are the same as the corresponding flat segmental guide surfaces of the device D. When the device D1 is substituted between the material advancing rollers 8, 8a and 9, 9a, and the material R is caused to travel through the device D1, in the same manner as previously described with respect to the device D, the central portion of the material R will first slide in lengthwise direction and flat formation along the guide surface 2a of the device D1, and the contiguous side portions of the material R will contactingly slide along the vertical flat side guide surfaces of the member 2, of the device D1 until they reach the center of the device D1 where the member 2 is at its maximum height. At this point, the material R will have its contiguous central and side portions arranged in exactly the same relationship as shown in Fig. 12. Thereafter, the vertically arranged side portions of the material R will be progressively moved inwardly and under the central portion of the material R, by the sliding action of said vertically arranged side portions of the material along the inner walls of the V-shaped cut-out section formed between the side wall members 5 and 6 of the device D1, as well as the sliding action of said side portions along the smooth top surfaces of the members 10 and 11. While the side portions of the material R are being turned inwardly under the central portion of the material, the said central portion will extend, or be drawn from the highest point of the member 2, of the device D1, to its next point of support between the rollers 9 and 9a. From this it will be realized that the portion of the member 2, which provides the flat top guide surface 2b in the device D, can be omitted, if desired, as illustrated by the construction of the device D1.

Figure 18:
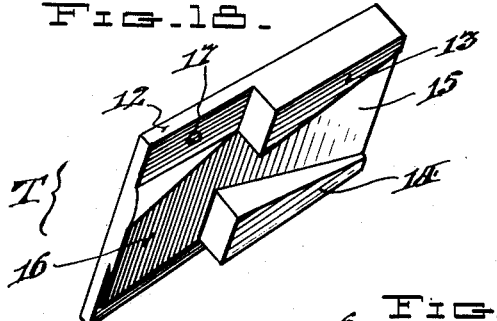
Fig. 18 is a perspective view of a cover-like member which is adapted to be associated with the device illustrated in Figs. 15, 16 and 17.
Figure 19:
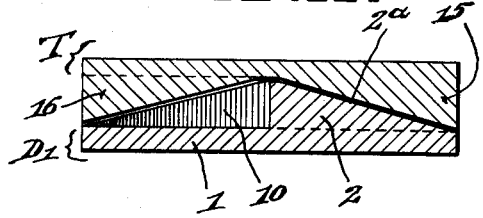
Fig. 19 is a central longitudinal elevational sectional view through the device shown in Figs. 15, 16 and 17 and the therewith combined member shown in Fig. 18.
Figure 17:
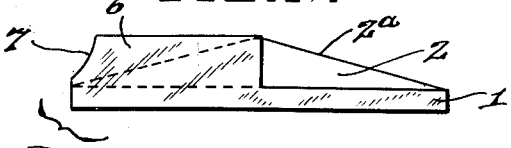
Fig. 17 is a side elevational view of the device shown in Figs. 15 and 16.

Fig. 18 is a bottom perspective view of a cover device, or complementary top section, for the device D1, which is adapted to be combined with the latter, as shown in Fig. 19, so as to provide a protective shield for the material R during its movement through the device D1. The said cover device, generally identified by the letter T, may be made of the same materials as the devices D and D1, or of transparent plastic material, or glass, and comprises a flat upper section 12 having integrally formed therewith four depending members 13, 14, 15 and 16, which are shaped as shown. When the cover device T is combined with the device D1, as shown in Fig. 19, the members 13 and 14 extend lengthwise along the opposite sides of the member 2, but the inner walls or edges of said members 13 and 14 are slightly spaced from the side walls of the member 2 a distance substantially equal to the width of the slots 3 and 4 of the device D shown in Fig. 2. Similarly, the members 15 and 16 will be spaced about the same distance above the top surfaces of the members 2, 10 and 11 of the device D1, so as to permit free movement of the material R along the surface 2a and the top surfaces of the members 10 and 11 of the device D1.

The cover device T may be secured to the top of the device D1 in any suitable manner, as by means of screws which may extend through plain apertures 17 in the cover device T and into therewith aligned threaded apertures 18 provided in the side wall members 5 and 6 of the device D1.

The cover device T is shown to exemplify how the material R passing through the device D1 may be shielded or protected, if desired, and it will consequently be understood that a similar cover device may be provided for the device D of Figs. 1 to 14 inclusive, or all the other modified forms of my device which are subsequently described herein.

Figs. 20 and 21 illustrate another modified form of my device in which the determined order, or pattern, of the flat guide surfaces for the ribbon-like material R are arranged to effect folding of the crosswise contiguous portions of the latter in the middle, as shown in Fig. 22, during lengthwise travel of the material R through the device in the manner heretofore described with respect to devices D and D1. Since the device of Figs. 20 and 21 is structurally the same in many respects to the described devices D and D1, the parts shown in Figs. 20 and 21, which substantially correspond with the parts of the devices D and D1, have been identified by the same reference characters to avoid redundancy of descriptive matter. However, for purposes of differentiation, the device of Figs. 20 and 21 is generally identified by the reference character D2.

The device D2 mainly differs from the devices D and D1 in that only a single slot S is provided which corresponds with the slot 4 in the devices D and D1, but which extends from one side of the end edge of the device D2 where the material R enters the device D2, to the opposite side of the end edge of the device D2 where the material R leaves the device D2. As clearly shown in Fig. 20, this arrangement of the slot S, eliminates from the device D2 the member designated 11 in the devices D and D1.

The device D2 is used in exactly the same manner as the devices D and D1. When the device D2 is substituted for the device D, between the two pairs of material advancing rollers 8, 8a and 9, 9a shown in Figs. 6 and 7, the ribbon-like material R which is caused to travel through the device D2, will be folded in the middle, as indicated in Fig. 22. The initial width of the material R, as it enters the device D2, will be equal to the portion A, shown in dot-and-dash lines in Fig. 22, plus the portion B shown in full lines. After passing through the device D2, the portion A of the material R will have been folded under the portion B, as illustrated by the right-hand side of Fig. 22.

Figs. 23 and 24 illustrate another modified form of my device in which the determined order, or pattern, of the flat guide surfaces for the ribbon-like material R are arranged to effect folding of the crosswise contiguous portions of the latter, as shown in Fig. 25, during lengthwise travel of the material R through the device as heretofore described with respect to the devices D and D1. Since the device of Figs. 23 and 24 is structurally the same in many respects to the described device D, the parts shown in Figs. 23 and 24, which substantially correspond with the device D, have been identified by the same reference characters. For purposes of differentiation, the device of Figs. 23 and 24 is generally identified by the reference character D3.

The device D3 mainly differs from the device D in that the slots 3 and 4 are spaced apart a certain distance at the end edge of the device D3 where the material R leaves the device D3.

The device D3 is also used in exactly the same manner as the previously described forms of my device. When the device D3 is substituted for the device D, between the two pairs of material advancing rollers 8, 8a and 9, 9a shown in Figs. 6 and 7, the ribbon-like material R which is caused to travel through the device D3 will have equal crosswise contiguous side edge portions thereof folded under the central portion thereof, as indicated in Fig. 25. The initial width of the material R, as it enters the device D3, will be equal to the two portions A, shown in dot-and-dash lines in Fig. 25, plus the central portion B shown in full lines. After passing through the device D3, the portions A of the material R will have been folded under the portion B, as clearly shown.

Figs. 26 and 27 illustrate another modified form of my device in which the determined order, or pattern, of the flat guide surfaces for the ribbon-like material R are arranged to effect reversal, or a turning upside down, of the crosswise contiguous portions of the latter, as shown in Fig. 28, during lengthwise travel of the material R through the device in the manner heretofore described with respect to the devices D and D1. Since the device of Figs. 26 and 27 is structurally the same in many respects to the devices heretofore described, and more particularly similar to the device D2, the parts shown in Figs. 26 and 27, which substantially correspond with the parts of the previously described devices, have been identified by the same reference characters. For purposes of differentiation, the device of Figs. 26 and 27 is generally identified by the reference character D4.

The device D4 mainly differs from the device D2 in that the slot S is arranged to pass through the center point of the device D4, thereby making the top material guide surfaces of the members 2 and 10 equal in shape and size. Otherwise, the members 2 and 10 are also the same but arranged in opposition relative to each other.

The device D4 is used in exactly the same manner as the previously described forms of my device. When the device D4 is substituted for the device D, between the two pairs of material advancing rollers 8, 8a and 9, 9a shown in Figs. 6 and 7, the ribbon-like material R which is caused to travel through the device D4 will be reversed, or turned upside down. The initial width of the material R, as it enters the device D4, is represented by the dot-and-dash section of Fig. 28. After passing through the device D4, the width of the material R will be exactly the same as when it entered the device D4, but it will have been turned through 180 degrees, as indicated by the arrow in Fig. 28.

From the foregoing disclosure of the devices D, D1, D2, D3 and D4, it is believed to be apparent that numerous other similar devices can be provided in accordance with my invention, in which the determined order, or pattern, of the flat guide surfaces for the ribbon-like material R can be otherwise arranged to effect further or additional changes in the transverse arrangement of the crosswise contiguous portions of the ribbon-like material. In this connection, it is also believed to be apparent that two or more of the devices D, D1, D2, D3 and D4, or modified forms of the same, can be successively arranged in series order, so that the ribbon-like material will travel through one after another of such devices, to effect a multiple folding action on the crosswise contiguous portions of the ribbon-like material, and said portions will be arranged as illustrated in Figs. 29 to 35 inclusive, wherein the cross-section of the ribbon-like material R is represented by a heavy black line for purposes of simplification of these illustrations.

Since various practical and illustrative embodiments of my invention are herein specifically disclosed in the form of the devices D, D1, D2, D3 and D4, it is believed to be apparent to those skilled in this art how a ribbon-like material may be folded as shown in Figs. 29 to 35 inclusive, by one or more devices which are constructed in accordance with my invention, and utilized as above indicated, without making a further specific disclosure respecting this.

It will be understood, therefore, that the various embodiments of my device which are herein specifically shown and described, can be changed and modified in various ways without departing from the invention herein disclosed and more particularly defined by the hereto appended claim.

I claim:

A device for changing the transverse arrangement of contiguous portions of a ribbon-like material during its travel from one material supporting element to another, which device comprises, a material guide structure adapted to be mounted between said supporting elements and provided with primary guide surfaces arranged in successive upwardly and downwardly inclined order above the supporting level between said supporting elements, and complimentary guide surfaces spacedly arranged along the edge and below said primary guide surfaces for contactingly conducting the edge portions of the material in lengthwise direction and effecting progressive folding of the edge portions of the material under the central portion of the latter.

EDWARD H. JACKSON, Jr.

REFERENCES CITED

The following references are of record in the file of this patent:

UNITED STATES PATENTS

| Number | Name | Date |
|---|---|---|
| 260,059 | Steers | June 27, 1882 |
| 1,003,023 | Ziegler | Sept. 12, 1911 |
| 1,618,711 | Hunt | Feb. 22, 1927 |
| 2,079,122 | Lawton | May 4, 1937 |
| 2,128,664 | Sackner et al. | Aug. 30, 1938 |
| 2,219,115 | Sackner et al. | Oct. 22, 1940 |
| 2,309,093 | Borden | Jan. 26, 1943 |

FOREIGN PATENTS

| Number | Country | Date |
|---|---|---|
| 12,141 | France | July 20, 1910 |